US 11,458,450 B2
Oct. 4, 2022

(12) United States Patent
Duran-Martin et al.

(54) MIXED OXIDE AND ITS USE AS NOX ADSORBER

(71) Applicant: JOHNSON MATTHEY PUBLIC LIMITED COMPANY, London (GB)

(72) Inventors: Desiree Duran-Martin, Reading (GB); Jose Villoria, Reading (GB)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 17/301,151

(22) Filed: Mar. 26, 2021

(65) Prior Publication Data

US 2021/0299632 A1    Sep. 30, 2021

Related U.S. Application Data

(60) Provisional application No. 63/002,484, filed on Mar. 31, 2020.

(51) Int. Cl.
| | | |
|---|---|---|
| *B01J 20/08* | (2006.01) | |
| *B01J 20/30* | (2006.01) | |
| *B01D 53/04* | (2006.01) | |
| *B01D 53/94* | (2006.01) | |
| *C01G 45/12* | (2006.01) | |
| *F01N 3/021* | (2006.01) | |
| *F01N 3/10* | (2006.01) | |
| *F01N 3/28* | (2006.01) | |
| *F01N 3/20* | (2006.01) | |

(52) U.S. Cl.
CPC .............. *B01J 20/08* (2013.01); *B01D 53/04* (2013.01); *B01D 53/9481* (2013.01); *B01J 20/3071* (2013.01); *B01J 20/3085* (2013.01); *C01G 45/12* (2013.01); *F01N 3/021* (2013.01); *F01N 3/101* (2013.01); *F01N 3/105* (2013.01); *F01N 3/2066* (2013.01); *F01N 3/28* (2013.01); *B01D 2253/104* (2013.01); *B01D 2257/404* (2013.01); *B01D 2259/40088* (2013.01); *C01P 2002/52* (2013.01); *C01P 2002/72* (2013.01); *F01N 2370/02* (2013.01)

(58) Field of Classification Search
CPC .... B01J 20/3085; B01J 20/08; B01J 20/3071; B01J 23/34; B01D 2253/104; B01D 2259/40088; B01D 53/9477; B01D 2251/304; B01D 53/04; B01D 53/9481; B01D 2253/1124; B01D 2257/404; B01D 2251/402; B01D 53/9422; B01D 2258/012; F01N 3/28; F01N 2370/02; F01N 3/2066; F01N 3/101; F01N 3/021; F01N 3/0842; F01N 2570/14; Y02T 10/12; C01P 2002/52; C01P 2002/72; G01G 45/12

See application file for complete search history.

(56) References Cited

U.S. PATENT DOCUMENTS

| | | | |
|---|---|---|---|
| 5,492,883 A | | 2/1996 | Wu |
| 5,565,394 A | | 10/1996 | Lachman et al. |
| 5,633,217 A | | 5/1997 | Lynn |
| 5,656,244 A | | 8/1997 | Cole |
| 6,727,202 B2 * | | 4/2004 | Deeba ............... F01N 3/0842 502/25 |
| 2011/0005200 A1 | | 1/2011 | Gandhi et al. |
| 2012/0308439 A1 | | 12/2012 | Chen et al. |
| 2013/0294990 A1 * | | 11/2013 | Koch .............. B01D 53/9477 423/213.2 |
| 2018/0043335 A1 * | | 2/2018 | Gru .................. B01J 23/44 |
| 2020/0048106 A1 | | 2/2020 | Babiniec et al. |
| 2020/0316568 A1 * | | 10/2020 | Fisher ............... B01J 37/038 |
| 2021/0113994 A1 * | | 4/2021 | Leonard ............ B01J 37/031 |

FOREIGN PATENT DOCUMENTS

| | | | | |
|---|---|---|---|---|
| DE | 60 223 049 T2 * | 7/2008 | ......... B01D 53/9431 |
| EP | 1027919 A1 | 8/2000 | |
| JP | 2000119025 A | 4/2000 | |
| WO | WO 2004 076 829 A1 * | 9/2004 | ............... F01N 3/08 |
| WO | 2008047170 A1 | 4/2008 | |
| WO | WO 2018 065 753 A1 * | 4/2018 | ............ B01J 23/002 |

OTHER PUBLICATIONS

Fan Lin et al., "Preparation of MnOx—CeO2—Al2O3 Mixed Oxides for NOx-assisted Soot Oxidation: Activity, Structure and Thermal Stability", Chemical Engineering Journal, 226, (2013) pp. 105-112.

Schonebom et al., "Improved NOx Storage/Release Properties of Ceria-Based Lean NOx Trap Compositions with WinOx Modification", Materials, 2019, 12, 16 pages.

* cited by examiner

Primary Examiner — Timothy C Vanoy

(57) ABSTRACT

The present disclosure is directed to a mixed oxide composition comprising manganese, aluminum and/or magnesium, and a rare earth element; a method of making the mixed oxide composition; a NOx adsorber comprising the mixed oxide composition; an exhaust system for internal combustion engines comprising the NOx adsorber; and a method for reducing NOx in an exhaust gas that employs the NOx adsorber.

18 Claims, 9 Drawing Sheets

MIXED OXIDE AND ITS USE AS NOX ADSORBER

TECHNICAL FIELD

The present disclosure is directed to a mixed oxide composition comprising manganese, aluminum and/or magnesium, and a rare earth element. The present disclosure is also directed to a NOx adsorber comprising the mixed oxide composition.

BACKGROUND OF THE INVENTION

Internal combustion engines produce exhaust gases containing a variety of pollutants, including nitrogen oxides ("NOx"), carbon monoxide, and uncombusted hydrocarbons. These emissions are the subject of governmental legislation. Emission control systems are widely utilized to reduce the amount of these pollutants emitted to atmosphere, and typically achieve very high efficiencies once they reach their operating temperature (typically, 200° C. or higher). However, these systems are relatively inefficient below their operating temperature (the "cold start" period).

For instance, current urea based selective catalytic reduction (SCR) applications implemented for meeting Euro 6 b emissions require that the temperature at the urea dosing position be above about 180° C. before urea can be dosed and used to convert NOx. NOx conversion below 180° C. is difficult to address using the current systems, and future European and US legislation will stress the low temperature NOx storage and conversion. Currently this is achieved by heating strategies, but this has a detrimental effect of $CO_2$ emissions.

As even more stringent national and regional legislation lowers the amount of pollutants that can be emitted from diesel or gasoline engines, reducing emissions during the cold start period is becoming a major challenge. Thus, methods for reducing the level of NOx emitted during cold start condition continue to be explored.

For instance, WO 2008/047170 discloses a system wherein NOx from a lean exhaust gas is adsorbed at temperatures below 200° C. and is subsequently thermally desorbed above 200° C. The NOx adsorbent is taught to consist of palladium and a cerium oxide or a mixed oxide or composite oxide containing cerium and at least one other transition metal.

U.S. Appl. Pub. No. 2011/005200 teaches a catalyst system that simultaneously removes ammonia and enhances net NOx conversion by placing an ammonia-selective catalytic reduction ("$NH_3$—SCR") catalyst formulation downstream of a lean NOx trap. The $NH_3$—SCR catalyst adsorbs the ammonia that is generated during the rich pulses in the lean NOx trap. The stored ammonia then reacts with the NOx emitted from the upstream lean NOx trap, which increases NOx conversion rate while depleting the stored ammonia.

WO 2004/076829 discloses an exhaust-gas purification system which includes a NOx storage catalyst arranged upstream of an SCR catalyst. The NOx storage catalyst includes at least one alkali, alkaline earth, or rare earth element which is coated or activated with at least one platinum group metal (Pt, Pd, Rh, or Ir). A particularly preferred NOx storage catalyst is taught to include cerium oxide coated with platinum and additionally platinum as an oxidizing catalyst on a support based on aluminum oxide. EP 1027919 discloses a NOx adsorbent material that comprises a porous support material, such as alumina, zeolite, zirconia, titania, and/or lanthana, and at least 0.1 wt % precious metal (Pt, Pd, and/or Rh). Platinum carried on alumina is exemplified. U.S. Appl. Pub. No. 2012/0308439 teaches a cold start catalyst that comprises (1) a zeolite catalyst comprising a base metal, a noble metal, and a zeolite, and (2) a supported platinum group metal catalyst comprising one or more platinum group metals and one or more inorganic oxide carriers.

As with any automotive system and process, it is desirable to attain still further improvements in exhaust gas treatment systems. We have discovered a mixed oxide composition that is effective to adsorb NOx.

SUMMARY OF THE INVENTION

In the first aspect, the invention is a mixed oxide composition comprising manganese, aluminum and/or magnesium, and a rare earth element.

In the second aspect, the invention is a method of making the mixed oxide composition. The method comprises: mixing a manganese source, an aluminum source and/or a magnesium source, and a rare earth element source to form an aqueous solution having a manganese to aluminum and magnesium atomic ratio of from about 100:10 to about 100:70 and a manganese to the rare earth element atomic ratio of from about 100:8 to about 100:80; mixing the aqueous solution with an alkali solution to form a slurry comprising a solid; and isolating the solid.

In the third aspect, the invention is a NOx adsorber effective to adsorb NOx. The NOx adsorber comprises the mixed oxide composition.

In the fourth aspect, the invention is an exhaust system for internal combustion engines comprising the NOx adsorber and a catalyst component selected from the group consisting a selective catalytic reduction (SCR) catalyst, a particulate filter, a SCR filter, a three-way catalyst, an oxidation catalyst, a second NOx adsorber catalyst, and combinations thereof.

In the fifth aspect, the invention is a method for reducing NOx in an exhaust gas. The method comprises adsorbing NOx by the NOx adsorber, and catalytically removing the desorbed NOx on a catalyst component downstream of the NOx adsorber. The catalyst component downstream of the NOx adsorber is a SCR catalyst, a particulate filter, a SCR filter, a second NOx adsorber catalyst, a three-way catalyst, an oxidation catalyst, or combinations thereof.

DETAILED DESCRIPTION OF THE INVENTION

Figure 1:
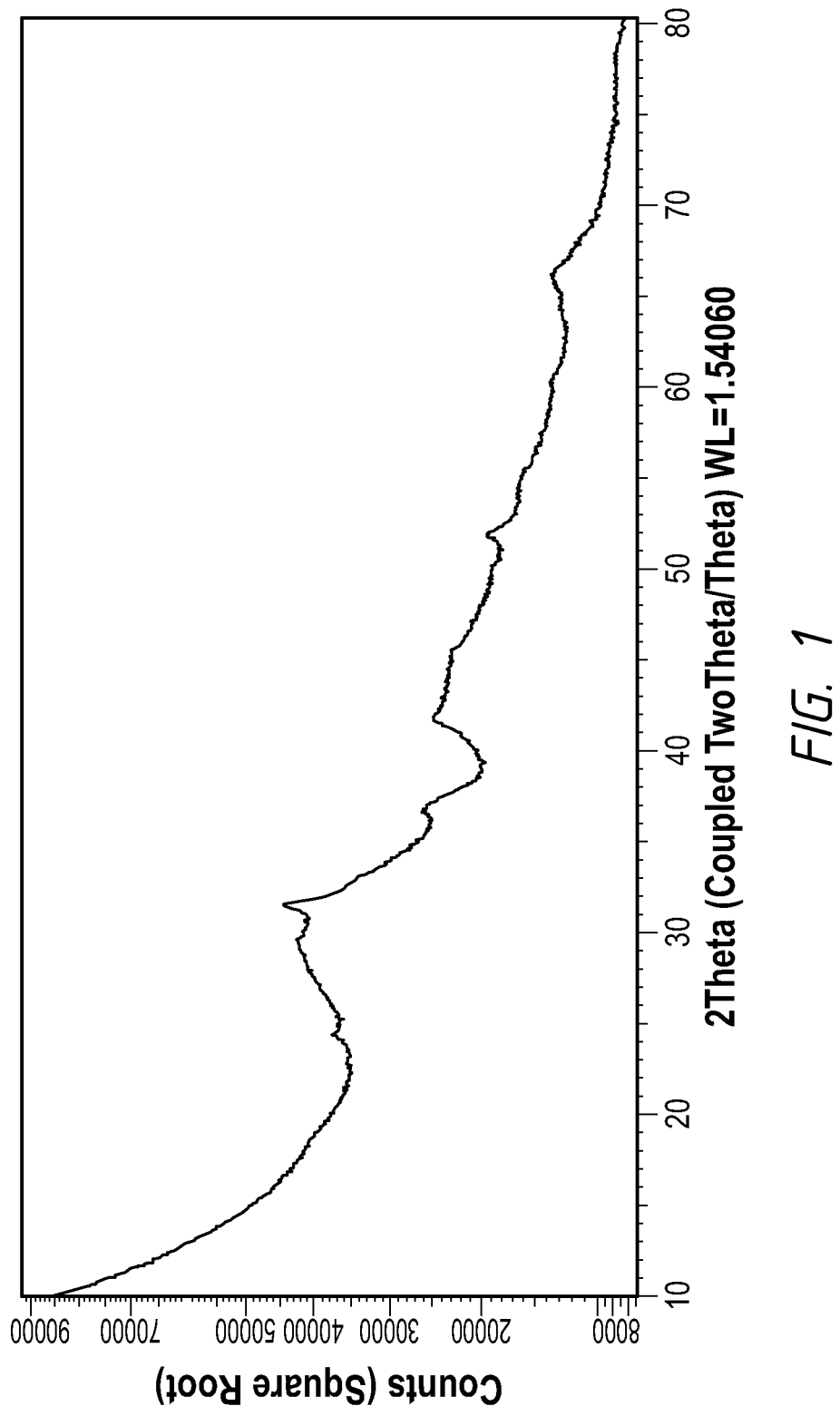
FIG. 1 shows XRD pattern of MO-A.

In the first aspect, the present invention is a mixed oxide composition comprising manganese, aluminum and/or magnesium, and a rare earth element.

The term "and/or" refers to separate embodiments where the materials or conditions linked by this term are either alternatively or collectively present.

In addition to manganese and a rare earth element, the mixed oxide composition of the invention comprises aluminum or magnesium, or a combination of aluminum and magnesium.

The mixed oxide composition generally has a manganese to aluminum and magnesium atomic ratio of from about 100:10 to about 100:70 and a manganese to the rare earth element atomic ratio of from about 100:8 to about 100:80.

The term "manganese to aluminum and magnesium atomic ratio" refers to the ratio of the number of manganese atoms to the combination of the number of aluminum atoms and the number of magnesium atoms within the mixed oxide composition.

The mixed oxide composition preferably has a manganese to aluminum and magnesium atomic ratio of from about 100:15 to about 100:65, most preferably from about 100:20 to about 100:60, even more preferably from about 100:25 to about 100:55.

The rare earth element in the mixed oxide composition refers to one or more of a set of seventeen chemical elements in the periodic table, specifically the fifteen lanthanides, scandium and yttrium. The rare earth element in the mixed oxide composition is selected from the group consisting of cerium (Ce), dysprosium (Dy), erbium (Er), europium (Eu), gadolinium (Gd), holmium (Ho), lanthanum (La), lutetium (Lu), neodymium (Nd), praseodymium (Pr), samarium (Sm), scandium (Sc), terbium (Tb), thulium (Tm), ytterbium (Yb), yttrium (Y), and mixture thereof. The rare earth element in the mixed oxide composition is preferably selected from the group consisting Ce, Y, La, and mixture thereof. One particularly preferred rare earth element is La.

The mixed oxide composition preferably has a manganese to the rare earth element atomic ratio of from about 100:10 to about 100:70, most preferably from about 100:10 to about 100:50, even more preferably from about 100:10 to about 100:30.

The term "manganese to the rare earth element atomic ratio" refers to the ratio of the number of manganese atoms to the total number of all rare earth elements present in the mixed oxide composition.

The mixed oxide composition has an aluminum to magnesium atomic ratio of from 100:0 to 0:100, preferably from about 99:1 to about 1:99, more preferably from about 95:5 to about 5:95, most preferably from about 90:10 to about 10:90.

The mixed oxide composition generally has a manganese content of about weight percent ("wt %") to about 60 wt % relative to the mixed oxide composition, preferably about 20 wt % to about 55 wt %, most preferably about 30 wt % to about 50 wt %.

In addition to manganese, aluminum and/or magnesium, rare earth elements, and oxygen, the mixed oxide composition may comprise other elements.

The mixed oxide composition may comprise an alkali metal selected from group consisting of lithium (Li), sodium (Na), potassium (K), rubidium (Rb), cesium (Cs), and mixture thereof. The content of alkali metal is generally less than about 10 wt % relative to the mixed oxide composition, preferably less than about 5.0 wt %, more preferably less than about 2.0 wt %, most preferably less than about 1.0 wt %.

The mixed oxide composition may comprise an alkaline earth metal selected from group consisting of calcium (Ca), strontium (Sr), barium (Ba), and mixture thereof. The content of alkaline earth metal is generally less than 10 wt % relative to the mixed oxide composition, preferably less than about 5.0 wt %, more preferably less than about 2.0 wt %, most preferably less than about 1.0 wt %.

The mixed oxide composition may comprise a transition metal in addition to manganese. The transition metal is preferably selected from the group consisting of scandium (Sc), titanium (Ti), vanadium (V), chromium (Cr), iron (Fe), cobalt (Co), nickel (Ni), copper (Cu), zinc (Zn), zirconium (Zr), niobium (Nb), molybdenum (Mo), ruthenium (Ru), rhodium (Rh), palladium (Pd), silver (Ag), cadmium (Cd), Cerium (Ce), tantalum (Ta), tungsten (W), rhenium (Re), osmium (Os), iridium (Ir), platinum (Pt), gold (Au), and mixture thereof. More preferably, the transition metal is selected from the group consisting of titanium (Ti), vanadium (V), chromium (Cr), iron (Fe), cobalt (Co), nickel (Ni), copper (Cu), zinc (Zn), zirconium (Zr), niobium (Nb), molybdenum (Mo), ruthenium (Ru), rhodium (Rh), tungsten (W), and mixture thereof. Most preferably, the transition metal is selected from the group consisting of iron (Fe), cobalt (Co), nickel (Ni), copper (Cu), zinc (Zn), zirconium (Zr), and mixture thereof. The content of the transition metal is generally less than about 5.0 wt % relative to the mixed oxide composition, preferably less than about 3.0 wt %, more preferably less than about 2.0 wt %, and most preferably less than about 1.0 wt %.

The mixed oxide composition may comprise an element selected from the group consisting of boron (B), silicon (Si), germanium (Ge), tin (Sn), gallium (Ga), lead (Pb), and mixture thereof. The mixed oxide composition more preferably comprise an element selected from the group consisting of boron (B), silicon (Si), and mixture thereof. The content of these elements is generally less than about 5.0 wt % relative to the mixed oxide composition, preferably less than about 3.0 wt %, more preferably less than about 2.0 wt %, and most preferably less than about 1.0 wt %.

The mixed oxide composition may additionally comprise an anion selected from the group consisting of carbonate ($CO_3^{2-}$), sulfate ($SO_4^{2-}$), nitrate ($NO_3^-$), phosphate ($PO_4^{3-}$), chloride ($Cl^-$), bromide ($Br^-$), iodide ($I^-$), and mixture thereof. The content of the anion is generally less than 5.0 wt % relative to the mixed oxide composition, preferably less than about 3.0 wt %, more preferably less than about 2.0 wt %, most preferably less than about 1.0 wt %. For instance, the mixed oxide composition may comprise nitrate ion ($NO_3^-$) in an amount of less than about 5.0 wt %, preferably less than about 3.0 wt %, more preferably less than about 2.0 wt %, most preferably less than about 1.0 wt %. In another instance, the mixed oxide composition may comprise carbonate ion ($CO_3^{2-}$) in an amount of less than about 5.0 wt %, preferably less than about 3.0 wt %, more preferably less than about 2.0 wt %, most preferably less than about 1.0 wt %. In yet another instance, the mixed oxide composition may comprise sulfate ion ($SO_4^{2-}$) in an amount of less than about 5.0 wt %, preferably less than about 3.0 wt %, more preferably less than about 2.0 wt %, most preferably less than about 1.0 wt %. In a further instance, the mixed oxide composition may comprise phosphate ion ($PO_4^{3-}$) in an amount of less than about 5.0 wt %, preferably less than about 3.0 wt %, more preferably less than about 2.0 wt %, most preferably less than about 1.0 wt %.

The mixed oxide composition typically has a degree of crystallinity of less than 80%, preferably less than 70%, more preferably less than 60%.

The term "degree of crystallinity" refers to the percentage of crystalline phase in the mixed oxide composition, which is a representation of structural order in the composition. The degree of crystallinity of the mixed oxide composition can be determined by its XRD or other known techniques. The degree of crystallinity can be determined by the relative peak area of the broad peaks and the sharp peaks in XRD. In one method of determining the degree of crystallinity, the observed X-ray scattering from a sample can be fitted using a series of peak functions. Peaks which have a reflection broadening indicate that a crystallite size of greater than 2 nm are considered to come from crystalline material. The summed area of these reflections is divided by the total area of all the peaks used to fit the data to yield the degree of crystallinity, see TOPAS 5 Technical Reference (Oct. 18, 2014), page 127. The background can be fitted using an order 0 shifted Chebychev with an additional 1/x term. The area under this function can be attributed to X-ray fluorescence from excitation of Mn (and Fe/Co where present) by CuKalph1+2 radiation and is independent of atomic ordering.

In one particularly preferred instance, the elements within the mixed oxide composition including manganese, aluminum and/or magnesium, the rare earth element, oxygen, and others if present, are homogenously distributed or substantially homogeneously distributed throughout the composition. The distribution of elements in the mixed oxide composition can be determined by known analytical techniques, for example, energy-dispersive X-ray spectroscopy (EDS, EDX, EDXS or XEDS) of the elements in a sample of the mixed oxide composition. This technique is also called energy dispersive X-ray analysis (EDXA) or energy dispersive X-ray microanalysis (EDXMA).

The mixed oxide composition generally has a BET surface area of from 10 to 300 m²/g, preferably from about 50 to about 250 m²/g, more preferably from about 100 to about 200 m²/g.

In the second aspect, the present invention is a method of making the mixed oxide composition. The method comprises: mixing a manganese source, an aluminum source and/or a magnesium source, and a rare earth element source to form an aqueous solution having a manganese to aluminum and magnesium atomic ratio of from about 100:10 to about 100:70 and a manganese to the rare earth element atomic ratio of from about 100:8 to about 100:80; mixing the aqueous solution with an alkali solution to form a slurry comprising a solid; and isolating the solid.

The manganese source can be elemental manganese or a compound containing manganese. Suitable manganese sources include, for example, manganese oxides such as $MnO_2$, $Mn_2O_3$, $Mn_3O_4$, and MnO, manganese hydroxides, manganese oxyhydroxides, permanganates, inorganic manganese salts such as manganese nitrate, manganese phosphates, manganese nitrites, manganese sulfates, manganese chlorides, manganese carbonates, and organic acid salts of manganese such as manganese acetates, manganese alkoxides, and their mixtures. Preferably, the manganese source is a manganese nitrate, manganese sulfate, manganese chloride, manganese carbonate, manganese acetate, or a mixture thereof. More preferably, the manganese source is a manganese nitrate.

The aluminum source can be elemental aluminum or a compound containing aluminum. Suitable aluminum sources include, for example, aluminum oxides, aluminum hydroxide, aluminum oxyhydroxides, inorganic aluminum salts such as aluminum nitrate, aluminum sulfate, aluminum phosphates, aluminum nitrite, aluminum chloride, aluminum carbonate, organic acid salts of aluminum such as aluminum acetate, aluminates, aluminum alkoxides, and their mixtures. Preferably, the aluminum source is aluminum nitrate, aluminum sulfate, aluminum chloride, aluminum carbonate, aluminum acetate, or a mixture thereof. More preferably, the aluminum source is aluminum nitrate.

The magnesium source can be elemental magnesium or a compound containing magnesium. Suitable magnesium sources include, for example, magnesium oxides, magnesium hydroxide, magnesium oxyhydroxides, inorganic magnesium salts such as magnesium nitrate, magnesium sulfate, magnesium phosphates, magnesium nitrite, magnesium chloride, magnesium carbonate, organic acid salts of magnesium such as magnesium acetate, magnesium alkoxides, and their mixtures. Preferably, the magnesium source is magnesium nitrate, magnesium sulfate, magnesium chloride, magnesium carbonate, magnesium acetate, or a mixture thereof. More preferably, the aluminum source is aluminum nitrate.

The rare earth element source can be an elemental rare earth element or a compound containing a rare earth element. Suitable rare earth element sources include oxides, hydroxides, oxyhydroxides, salts such as nitrates, sulfates, phosphates, nitrites, chlorides, carbonates, organic acid salts of rare earth elements, and mixtures thereof. Preferably, the rare earth element source is a nitrate, sulfate, chloride, acetate, or a mixture thereof. More preferably, the rare earth element source is a nitrate.

The manganese source, the aluminum source and/or the magnesium source, and the rare earth element source are mixed, dissolved, and/or reacted with water or a liquid containing water to form an aqueous solution. Optionally, the liquid may contain an organic compound such as an alcohol, an aldehyde, an organic amine, a carboxylate, and the like. In addition to the manganese source, the aluminum source and/or the magnesium source, and the rare earth element source, other components such as an acid (e.g., nitric acid, sulfuric acid, phosphoric acid, hydrochloric acid, and the like), a base (e.g., alkali metal hydroxides, alkali metal oxides, alkali metal carbonates, alkaline earth metal hydroxides, alkaline earth metal oxides, alkaline earth metal carbonates, ammonium hydroxide, ammonia, organic bases, and mixtures thereof) may also be used to form the aqueous solution.

The aqueous solution typically has a manganese to aluminum and magnesium atomic ratio of from about 100:10 to about 100:70 and a manganese to the rare earth element atomic ratio of from about 100:8 to about 100:80.

The aqueous solution preferably has a manganese to aluminum and magnesium atomic ratio of from about 100:15 to about 100:65, more preferably from about 100:20 to about 100:60, most preferably from about 100:25 to about 100:55.

The aqueous solution preferably has a manganese to rare earth element atomic ratio of from about 100:10 to about 100:70, more preferably from about 100:20 to about 100:60, most preferably from about 100:30 to about 100:50.

The aqueous solution can have an aluminum to magnesium atomic ratio of from 100:0 to 0:100, preferably from about 99:1 to about 1:99, more preferably from about 95:5 to about 5:95, most preferably from about 90:10 to about 10:90.

The aqueous solution generally has a manganese content of about 1.0 wt % to about 8.0 wt % relative to the weight of the solution, preferably about 2.0 wt % to about 6.0 wt %, more preferably about 3.0 wt % to about 5.0 wt %.

The alkali solution is typically prepared by mixing a base with water. Suitable bases used for preparing the alkali solution include alkali metal hydroxides, alkali metal oxides, alkali metal carbonates, alkaline earth metal hydroxides, alkaline earth metal oxides, alkaline earth metal carbonates, ammonium hydroxide, ammonia, organic bases, and mixtures thereof. Preferred bases include alkali metal hydroxides, alkali metal oxides, alkali metal carbonates, ammonium hydroxide, ammonia, and mixtures thereof. Examples of particularly preferred bases include sodium hydroxide, sodium carbonate, potassium hydroxide, and potassium carbonate. In one instance, the alkali solution comprises sodium hydroxide and sodium carbonate. In another instance, the alkali solution comprises NaOH with a concentration of about 1.0 Mole per Liter ("M") to about 5.0 M and $Na_2CO_3$ with a concentration of about 0.5 M to about 3.0 M. In yet another instance, the alkali solution comprises NaOH with a concentration of about 2.0 M to about 4.0 M and $Na_2CO_3$ with a concentration of about 1.0 M to about 2.0 M.

The temperature at which the aqueous solution and the alkali solution are mixed in the method is not critical. For example, the aqueous solution and the alkali solution typically are mixed at a temperature of from about 10° C. to about 100° C. Conveniently, the aqueous solution and the alkali solution are mixed at room temperature.

Preferably, the slurry maintains a pH of from about 9 to about 12 while the aqueous solution and the alkali solution is mixed. More preferably, the slurry maintains a pH of from about 9.5 to about 11.5. Most preferably, the slurry maintains a pH of from about 10 to about 11. In one particularly preferred instance, the slurry maintains a pH of from about 10.3 to about 10.6.

The method comprises isolating the solid from the slurry by standard techniques such as filtration, centrifugation, or decanting.

The method may further comprise washing the solid. Typically, the solid is washed with water.

The method may further comprise drying the solid. Typically, the solid is dried at a temperature of from about 80° C. to about 300° C. The solid may be dried for a period of from 1 hour to 24 hours. The solid may be dried in air, in an inert atmosphere, in a reducing atmosphere, or under vacuum. Preferably, the solid is dried in air.

The method may further comprise calcining the solid. Typically, the solid is calcined at a temperature of from about 300° C. to about 900° C., preferably from about 400° C. to about 750° C., more preferably from about 450° C. to about 650° C., most preferably from about 475° C. to about 550° C. The solid may be calcined for a period of from about 1 hour to about 24 hours. The calcination may be performed in air, in an inert atmosphere, in a reducing atmosphere, or under vacuum. Preferably, the calcination is performed in air.

In the third aspect, the present invention is a NOx adsorber comprising the mixed oxide composition. The NOx adsorber of the invention is effective to adsorb NOx.

Preferably, the NOx adsorber further comprises a flow-through substrate or filter substrate. The flow-through or filter substrate is a substrate that is capable of containing the mixed oxide composition. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be of any shape, but is preferably square, sinusoidal, triangular, rectangular, hexagonal, trapezoidal, circular, or oval.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The NOx adsorber may be added to the flow-through or filter substrate by any known means. A representative process for adding the NOx adsorber using a washcoat procedure is set forth below. It will be understood that the process below can be varied according to different embodiments of the invention.

The NOx adsorber comprising the mixed oxide composition may be added to the flow-through or filter substrate by a washcoating step. The washcoating procedure is preferably performed by first slurrying finely divided particles of The NOx adsorber comprising the mixed oxide composition in an appropriate solvent, preferably water, to form a slurry. Additional components, such as transition metal oxides, binders, stabilizers, or promoters may also be incorporated in the slurry as a mixture of water-soluble or water-dispersible compounds.

The slurry preferably contains between about 10 wt % to about 70 wt % solid materials, more preferably between about 20 wt % to about 50 wt %. Prior to forming the slurry, the NOx adsorber comprising the mixed oxide composition is preferably subject to a size reduction treatment (e.g., milling) such that the average particle size of the solid particles is less than about 20 microns in diameter.

The flow-through or filter substrate may then be dipped one or more times into the slurry or the slurry may be coated on the substrate such that there will be deposited on the substrate the desired loading of the NOx adsorber comprising the mixed oxide composition.

The mixed oxide composition coating can cover the total length of the substrate, or alternately can only cover a portion of the total length of the substrate such that only an inlet zone or outlet zone of the NOx adsorber comprising the mixed oxide composition coating is formed. Preferably, the entire length of the substrate is coated with the slurry so that a washcoat of the NOx adsorber comprising the mixed oxide composition covers the entire surface of the substrate.

After the flow-through or filter substrate has been coated with the NOx adsorber comprising the mixed oxide composition, the coated substrate is preferably dried and then calcined by heating at an elevated temperature to form the coated substrate. Preferably, the calcination occurs at about 400° C. to about 600° C. for approximately about 1 to about 8 hours.

In an alternative fashion, the flow-through or filter substrate is comprised of the NOx adsorber. In this case, the mixed oxide composition is extruded to form the flow-through or filter substrate. The extruded substrate comprising the mixed oxide composition is preferably a honeycomb flow-through monolith.

Extruded substrates and honeycomb bodies, and processes for making them, are known in the art. See, for Example, U.S. Pat. Nos. 5,492,883, 5,565,394, and 5,633,217 and U.S. Pat. No. Re. 34,804. Typically, the mixed oxide composition is mixed with a permanent binder such as silicone resin and a temporary binder such as methylcellulose, and the mixture is extruded to form a green honeycomb body, which is then calcined and sintered to form the final small pore molecular sieve flow-through monolith.

In the fourth aspect, the invention is an exhaust system for internal combustion engines comprising the NOx adsorber. The exhaust system preferably comprises one or more additional after-treatment devices capable of removing pollutants from internal combustion engine exhaust gases at normal operating temperatures. Preferably, the exhaust system comprises the NOx adsorber and one or more other catalyst components selected from: (1) a selective catalytic reduction (SCR) catalyst, (2) a particulate filter, (3) a SCR filter, (4) a second NOx adsorber catalyst, (5) a three-way catalyst, (6) an oxidation catalyst, or any combination thereof.

The NOx adsorber can be incorporated as a component into any of the above after-treatment devices. That is, the NOx adsorber may be incorporated as a zone on a substrate that contains the other catalyst component; or may be incorporated as a layer on a substrate that contains the other catalyst component. As an illustrative example, the NOx adsorber may be a front zone on a substrate that also contains a diesel oxidation catalyst at the rear zone, or the NOx adsorber may be a rear zone on a substrate that also contains a diesel oxidation catalyst at the front zone; or the NOx adsorber may be the lower layer on a substrate with a diesel oxidation catalyst forming an overlayer over the lower layer, or the NOx adsorber may be an overlayer covering a lower layer comprising a diesel oxidation catalyst.

These after-treatment devices are well known in the art. Selective catalytic reduction (SCR) catalysts are catalysts that reduce NOx to $N_2$ by reaction with nitrogen compounds (such as ammonia or urea) or hydrocarbons (lean NOx reduction). A typical SCR catalyst comprises a vanadia-titania catalyst, a vanadia-tungsta-titania catalyst, or a metal/zeolite catalyst such as iron/beta zeolite, copper/beta zeolite, copper/SSZ-13, copper/SAPO-34, Fe/ZSM-5, or copper/ZSM-5.

Particulate filters are devices that reduce particulates from the exhaust of internal combustion engines. Particulate filters include catalyzed particulate filters and bare (non-catalyzed) particulate filters. Catalyzed particulate filters (for diesel and gasoline applications) include metal and metal oxide components (such as Pt, Pd, Fe, Mn, Cu, and ceria) to oxidize hydrocarbons and carbon monoxide in addition to destroying soot trapped by the filter.

Selective catalytic reduction filters (SCRF) are single-substrate devices that combine the functionality of an SCR and a particulate filter. They are used to reduce NOx and particulate emissions from internal combustion engines. In addition to the SCR catalyst coating, the particulate filter may also include other metal and metal oxide components (such as Pt, Pd, Fe, Mn, Cu, and ceria) to oxidize hydrocarbons and carbon monoxide in addition to destroying soot trapped by the filter.

NOx adsorber catalysts (NACs) are designed to adsorb NOx under lean exhaust conditions, release the adsorbed NOx under rich conditions, and reduce the released NOx to form $N_2$. NACs typically include a NOx-storage component (e.g., Ba, Ca, Sr, Mg, K, Na, Li, Cs, La, Y, Pr, and Nd), an oxidation component (preferably Pt) and a reduction component (preferably Rh). These components are contained on one or more supports.

Three-way catalysts (TWCs) are typically used in gasoline engines under stoichiometric conditions in order to convert NOx to $N_2$, carbon monoxide to $CO_2$, and hydrocarbons to $CO_2$ and $H_2O$ on a single device.

Oxidation catalysts, and in particular diesel oxidation catalysts (DOCs), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

The exhaust system can be configured so that the NOx adsorber is located close to the engine and the additional after-treatment device(s) are located downstream of the NOx adsorber. Thus, under normal operating conditions, engine exhaust gas first flows through the NOx adsorber prior to contacting the after-treatment device(s). Alternatively, the exhaust system may contain valves or other gas-directing means such that during the low temperature period (below a temperature ranging from about 150° C. to about 220° C., preferably about 200° C., as measured at the after-treatment device(s)), the exhaust gas is directed to contact the after-treatment device(s) before flowing to the NOx adsorber. Once the after-treatment device(s) reaches the operating temperature (about 150 to about 220° C., preferably about 200° C., as measured at the after-treatment device(s)), the exhaust gas flow is then redirected to contact the NOx adsorber prior to contacting the after-treatment device(s). This ensures that the temperature of the NOx adsorber remains low for a longer period of time, and thus improves efficiency of the NOx adsorber, while simultaneously allowing the after-treatment device(s) to more quickly reach operating temperature. U.S. Pat. No. 5,656,244, the teachings of which are incorporated herein by reference, for example, teaches means for controlling the flow of the exhaust gas during cold-start and normal operating conditions.

In the fifth aspect, the invention is a method for treating exhaust gas from an internal combustion engine. The method comprises adsorbing NOx by the NOx adsorber at temperatures at or below a low temperature, thermally desorbing NOx from the NOx adsorber at a temperature above the low temperature, and catalytically removing the desorbed NOx on a catalyst component downstream of the NOx adsorber.

The catalyst component downstream of the NOx adsorber can be a SCR catalyst, a particulate filter, a SCR filter, a second NOx adsorber catalyst, a three-way catalyst, an oxidation catalyst, or combinations thereof.

The following examples merely illustrate the invention. Those skilled in the art will recognize many variations that are within the spirit of the invention and scope of the claims.

Example 1

Mixed Oxide A ("MO-A")

Sodium hydroxide and sodium carbonate were dissolved in water to prepare a clear alkali solution with a concentration of 3.9 M NaOH and 2.0 M $Na_2CO_3$. $Mn(NO_3)_2 \cdot 4H_2O$ (940.8 g, 3.75 mol), $Mg(NO_3)_2 \cdot 6H_2O$ (192.0 g, 0.75 mol), $Al(NO_3)_3 \cdot 9H_2O$ (112.5 g, 0.30 mol), and $La(NO_3)_2 \cdot 6H_2O$ (519.6 g, 1.20 mol) were dissolved in water (2400 mL) to make a salt solution. The alkali solution was added to a 3-gallons container containing water (520 mL) and fitted with a pH probe and an overhead stirrer to adjust the pH to 10.5. The salt solution was added by a pump at a rate of 25 mL/min and the base was added via a dropper funnel to the container while the pH is kept at 10.4-10.6. A solid formed and the slurry was mixed with the stirrer throughout. Addition of salt solution took about 2 h. After the addition of the salt solution was complete the slurry was stirred at room temperature for additional 20 min. The solid was recovered by filtration with a Büchner funnel. The solid was washed with water until conductivity of the filtrate reached 120 μS. Washing lasted for 24 h. The solid was dried in an oven at 105° C. in air overnight then calcined at 500° C. in air for 2 h.

The mixed oxide MO-A has a Mn:(Al+Mg) atomic ratio of 100:28, a Mn:La atomic ratio of 100:32, and Mn content of 38.4 wt %.

The XRD of mixed oxide MO-A is show in FIG. 1. Mixed oxide MO-A has a degree of crystallinity of 9%.

Example 2

Mixed Oxide B (MO-B)

Sodium hydroxide and sodium carbonate were dissolved in water to give a clear alkali solution with a concentration 2.8 M NaOH and 1.5 M $Na_2CO_3$. A 1-L beaker was charged with water (50 mL) and fitted with a pH probe and an overhead stirrer. $Mn(NO_3)_2 \cdot 4H_2O$ (31.37 g, 0.125 mol), $Mg(NO_3)_2 \cdot 6H_2O$ (14.08 g, 0.055 mol), $Al(NO_3)_3 \cdot 9H_2O$ (3.75 g, 0.01 mol), and $La(NO_3)_2 \cdot 6H_2O$ (7.50 g, 0.02 mol) were dissolved in water (80 mL) to make a salt solution. The alkali solution was added to the beaker to adjust the pH to 10.5. The salt solution was pumped at a rate of 10 mL/min while the alkali solution was added via a dropper funnel to maintain pH at 10.3-10.6. A solid formed and the slurry was mixed with the stirrer throughout. Addition of the salt solution took about 30 min. After the addition of the salt solution was complete, the slurry was stirred at room temperature for additional 30 min. The solid was recovered by filtration with a Büchner funnel. The solid was washed with water until the conductivity of the filtrate reached 120 μS. Washing lasted about 4 h. The solid was dried in an oven at 105° C. in air overnight before calcination at 500° C. in air for 2 h.

The mixed oxide has a Mn:(Al+Mg) atomic ratio of 100:52, a Mn:La atomic ratio of 100:16, and Mn content of 43.4 wt %.

Figure 2:
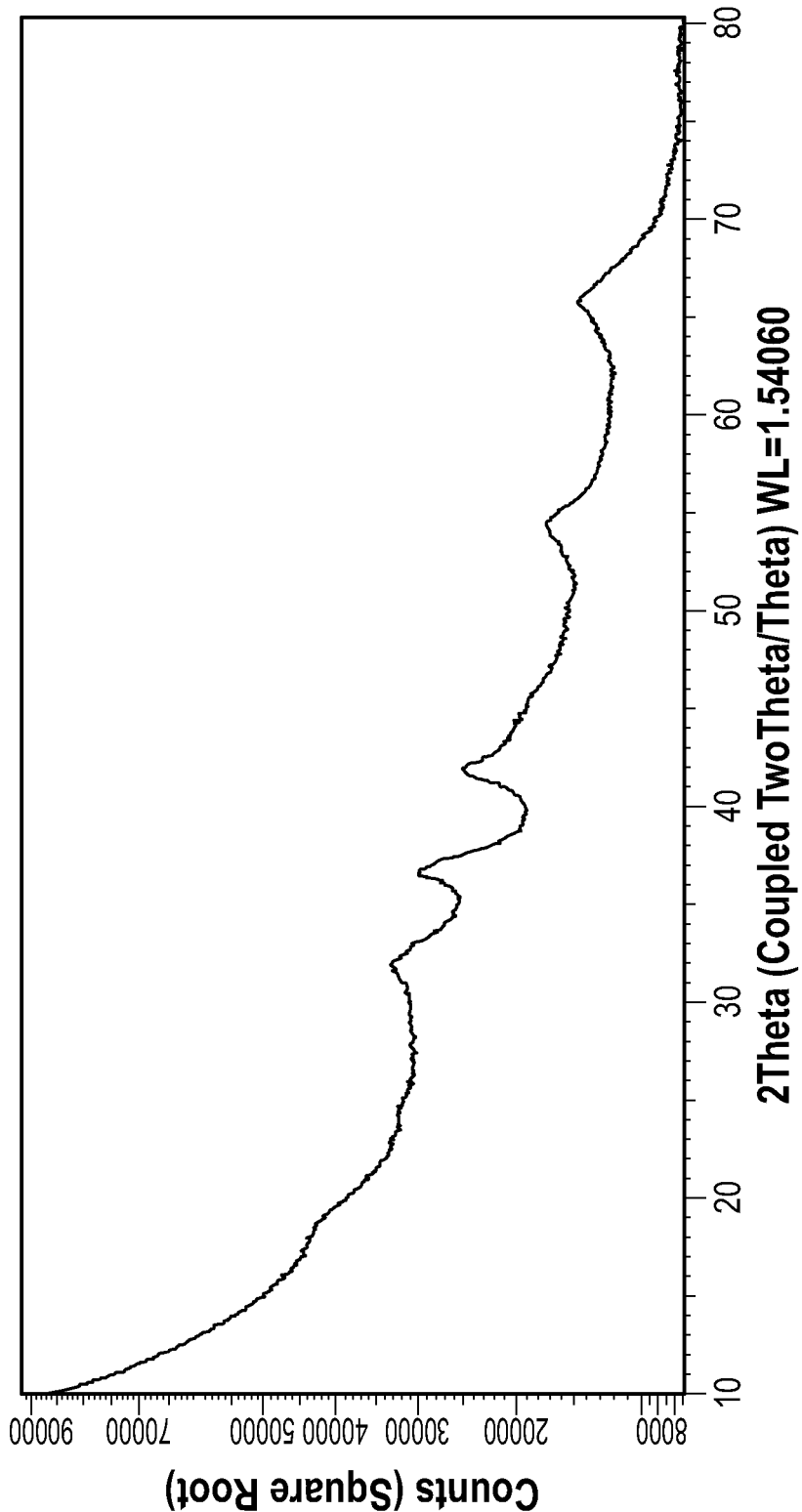
FIG. 2 shows XRD pattern of MO-B.

The XRD of mixed oxide MO-B is show in FIG. 2. Mixed oxide MO-B has a degree of crystallinity of 16%.

Example 3

Mixed Oxide C (MO-C)

Sodium hydroxide and sodium carbonate were dissolved in water to prepare a clear alkali solution with a concentration 2.8 M NaOH and 1.5 M $Na_2CO_3$. A 1-L beaker was charged with water (75 mL) and equipped with a pH probe and an overhead stirrer. $Mn(NO_3)_2 \cdot 4H_2O$ (31.36 g, 0.125 mol), $Mg(NO_3)_2 \cdot 6H_2O$ (6.43 g, 0.025 mol), $Al(NO_3)_3 \cdot 9H_2O$ (9.37 g, 0.025 mol), $La(NO_3)_2 \cdot 6H_2O$ (10.83 g, 0.025 mol) were dissolved in water (80 mL) to make a salt solution. The alkali solution was added to the beaker to adjust the pH to 10.5. The salt solution was pumped at a rate of 25 mL/min while the alkali solution was added via dropper funnel maintain pH at 10.3-10.6. A solid formed and the slurry was mixed with stirrer throughout. Addition of salt solution took about 20 min. After the addition of the salt solution was complete the slurry was stirred at room temperature for additional 20 minutes. The solid was recovered by filtration with a Büchner funnel. The solid was washed with water until the conductivity of filtrate reached 100 μS. Washing lasted about 4 h. The solid was dried in an oven at 105° C. in air overnight before calcination at 500° C. in air for 2 h.

The mixed oxide has a Mn:(Al+Mg) atomic ratio of 100:40, a Mn:La atomic ratio of 100:20, and Mn content of 42.4 wt %.

Mixed oxide MO-C has a degree of crystallinity of 4%.

Example 4

Mixed Oxide D (MO-D)

Sodium hydroxide and sodium carbonate were dissolved in water to prepare a clear alkali solution with a concentration 2.8 M NaOH and 1.5 M $Na_2CO_3$. A 1-L beaker was charged with water (50 mL) and fitted with a pH probe and an overhead stirrer. $Mn(NO_3)_2 \cdot 4H_2O$ (27.61 g, 0.11 mol), $Mg(NO_3)_2 \cdot 6H_2O$ (6.41 g, 0.025 mol), $Al(NO_3)_3 \cdot 9H_2O$ (3.76 g, 0.01 mol), $La(NO_3)_2 \cdot 6H_2O$ (17.31 g, 0.04 mol), $Cu(NO_3)_2 \cdot 3H_2O$ (3.62 g, 0.015 mol) were dissolved in water (80 mL) to make a salt solution. The alkali solution was added to the beaker to adjust the pH to 10.5. The salt solution and the alkali solution were added via pipettes to maintain pH at 10.3-10.6. Addition of salt solution took 20 min. After the addition of the salt solution the slurry was stirred at room temperature for additional 20 minutes. The solid was recovered by filtration with a Buchner funnel. The conductivity of the filtrate started at about 80 mS. The solid was washed with water until the conductivity of filtrate reached 105 μS. Washing lasted for 15 h. The solid was dried in an oven at 105° C. in air overnight, then calcination at 500° C. in air for 2 h.

The mixed oxide has a Mn:(Al+Mg) atomic ratio of 100:32, a Mn:La atomic ratio of 100:36, and Mn content of 33.8 wt %.

Example 5

Mixed Oxide E (MO-E)

Sodium hydroxide and sodium carbonate were dissolved in water to prepare a clear alkali solution with a concentrations of 2.8 M NaOH and 1.5 M $Na_2CO_3$. A 1-L beaker was charged with water (100 mL) and fitted with a pH probe and a magnetic stirrer. $Mn(NO_3)_2 \cdot 4H_2O$ (31.37 g, 0.125 mol) $Mg(NO_3)_2 \cdot 6H_2O$ (6.46 g, 0.025 mol) $Al(NO_3)_3 \cdot 9H_2O$ (9.40 g, 0.025 mol) La(NO$_3$)$_2$.6H$_2$O (8.66 g, 0.02 mol), Eu(NO$_3$)$_2$.6H$_2$O (2.26 g, 0.005 mol) were dissolved in water (80 mL) to make a salt solution. The alkali solution was added to the beaker to adjust the pH to about 10.5. The salt solution and the alkali solution were added to maintain pH at 10.3-10.6. Addition of salt solution took 15 min. After the addition of the salt solution the slurry was stirred at room temperature for additional 20 min. The solid was recovered by filtration with a Buchner funnel. The solid was washed with water until the conductivity of the filtrate reached 70 µS. Washing lasted for 4 h. The solid was dried in an oven at 105° C. in air overnight, then calcination at 500° C. in air for 2 h.

The mixed oxide has a Mn:(Al+Mg) atomic ratio of 100:40, a Mn:La atomic ratio of 100:20, and Mn content of 42.2 wt %.

Example 6

Mixed Oxide F (MO-F)

Sodium hydroxide and sodium carbonate were dissolved in water to prepare a clear alkali solution with a concentrations of 2.8 M NaOH and 1.5 M Na$_2$CO$_3$. A 1-L beaker was charged with water (80 mL) and fitted with a pH probe and a magnetic stirrer. Mn(NO$_3$)$_2$.4H$_2$O (31.35 g, 0.125 mol) Mg(NO$_3$)$_2$.6H$_2$O (6.44 g, 0.025 mol) La(NO$_3$)$_2$.6H$_2$O (10.86 g, 0.025 mol) were dissolved in water (80 mL) to make a salt solution. The alkali solution was added to the beaker to adjust the pH to 10.5. The salt solution and the alkali solution were added via pipettes to maintain pH at 10.3-10.6. Addition of the salt solution took 20 min. After the addition of the salt solution was complete the slurry was stirred at room temperature for additional 20 min. The solid was recovered by filtration with a Buchner funnel. The solid was washed with water until conductivity of filtrate reached 70 µS. Washing lasted for 6 h. The solid was dried in an oven at 105° C. in air overnight, then calcination at 500° C. in air for 2 h The mixed oxide has a Mn:Mg atomic ratio of 100:20, a Mn:La atomic ratio of 100:20, and Mn content of 46.0 wt %.

Figure 3:
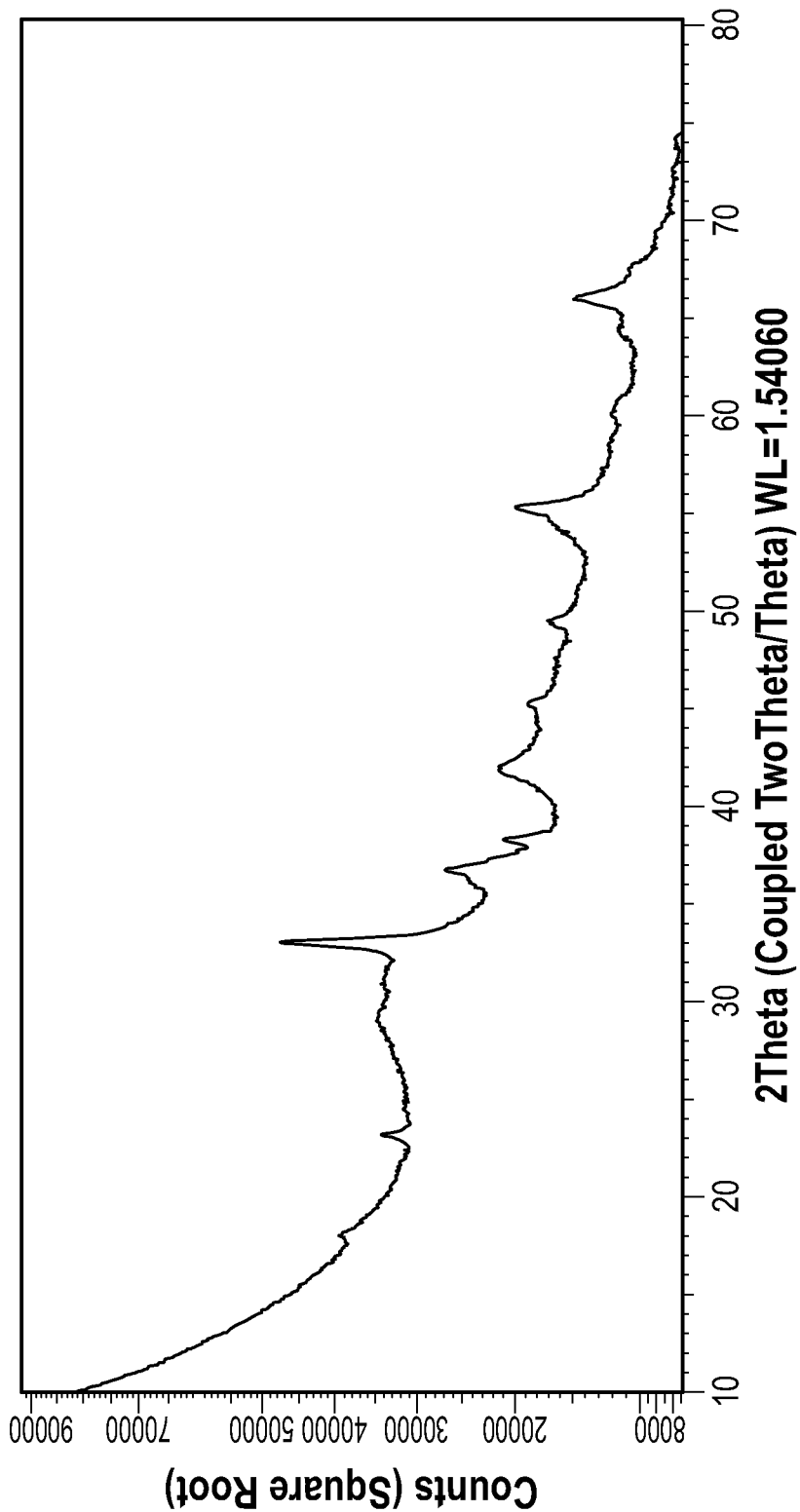
FIG. 3 shows XRD pattern of MO-F.

The XRD of mixed oxide MO-F is show in FIG. 3. Mixed oxide MO-F has a degree of crystallinity of 26%.

Example 7

Mixed Oxide G (MO-G)

Sodium hydroxide and sodium carbonate were dissolved in water to prepare a clear alkali solution with a concentrations of 2.8 M NaOH and 1.5 M Na$_2$CO$_3$. A 1-L beaker was charged with water (80 mL) and fitted with a pH probe and a magnetic stirrer. Mn(NO$_3$)$_2$.4H$_2$O (31.42 g, 0.125 mol), Al(NO$_3$)$_3$.9H$_2$O (9.36 g, 0.025 mol), La(NO$_3$)$_2$.6H$_2$O (10.838 g, 0.025 mol) were dissolved in water (80 mL) to make a salt solution. The alkali solution was added to the beaker to adjust the pH to about 10.5. The salt solution and the alkali solution were added via pipettes to maintain pH at 10.3-10.6. Addition of salt solution took 20 min. After the addition of the salt solution the slurry was stirred at room temperature for additional 20 min. The solid was recovered by filtration with a Buchner funnel. The solid was washed with water until conductivity of filtrate reached 70 µS. Washing lasted for 2 h. The solid was dried in an oven at 105° C. in air overnight, then calcination at 500° C. in air for 2 h.

The mixed oxide has a Mn:Al atomic ratio of 100:20, a Mn:La atomic ratio of 100:20, and Mn content of 45.2 wt %.

Figure 4:
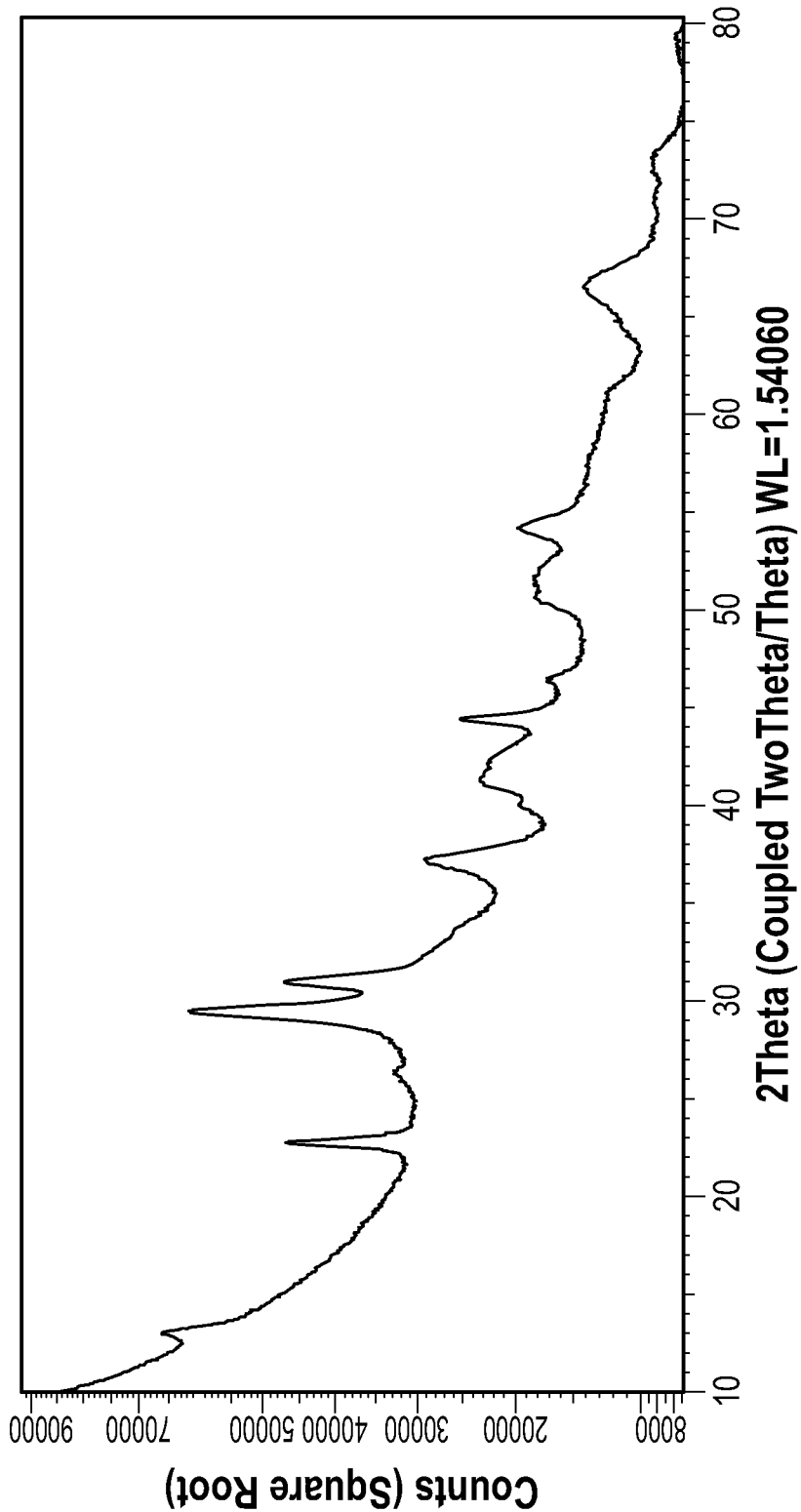
FIG. 4 shows XRD pattern of MO-G.
Figure 5:
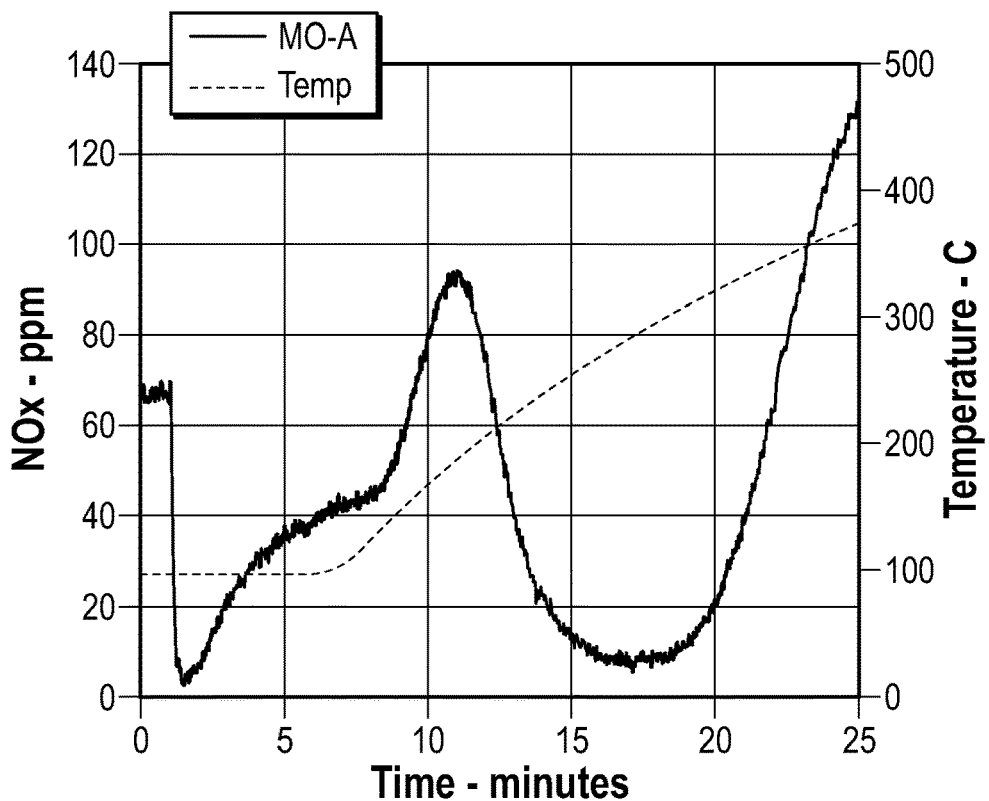
FIG. 5 shows the NOx storage and release vs. time profile for MO-A.
Figure 6:
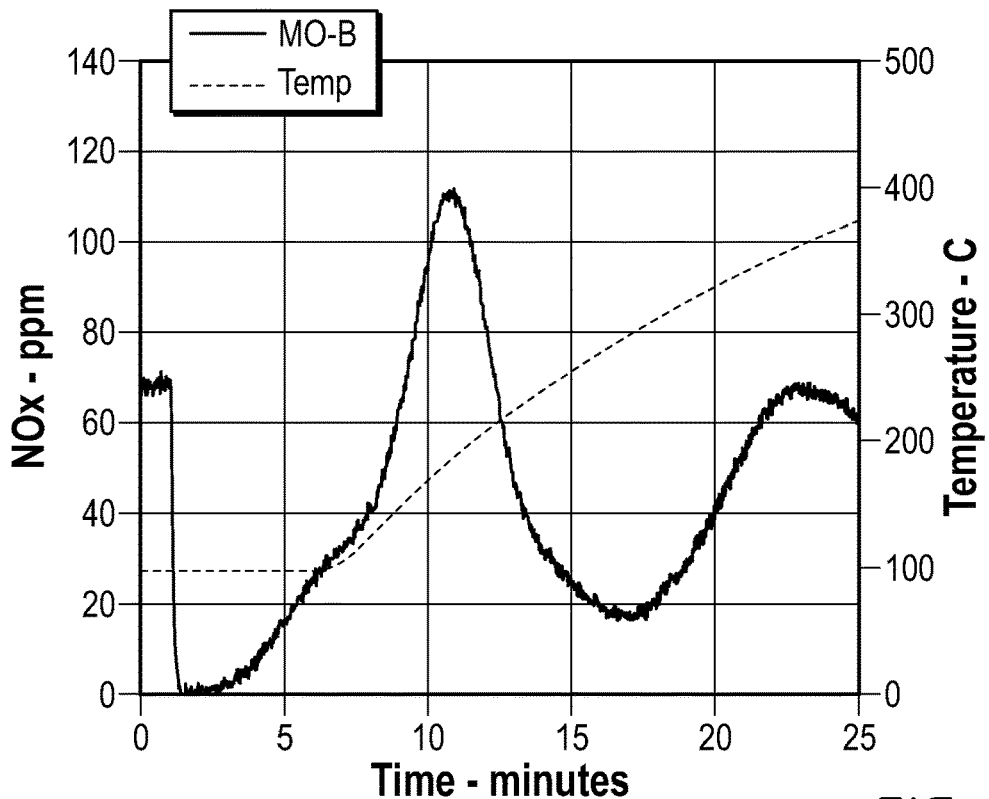
FIG. 6 shows the NOx storage and release vs. time profile for MO-B.
Figure 7:
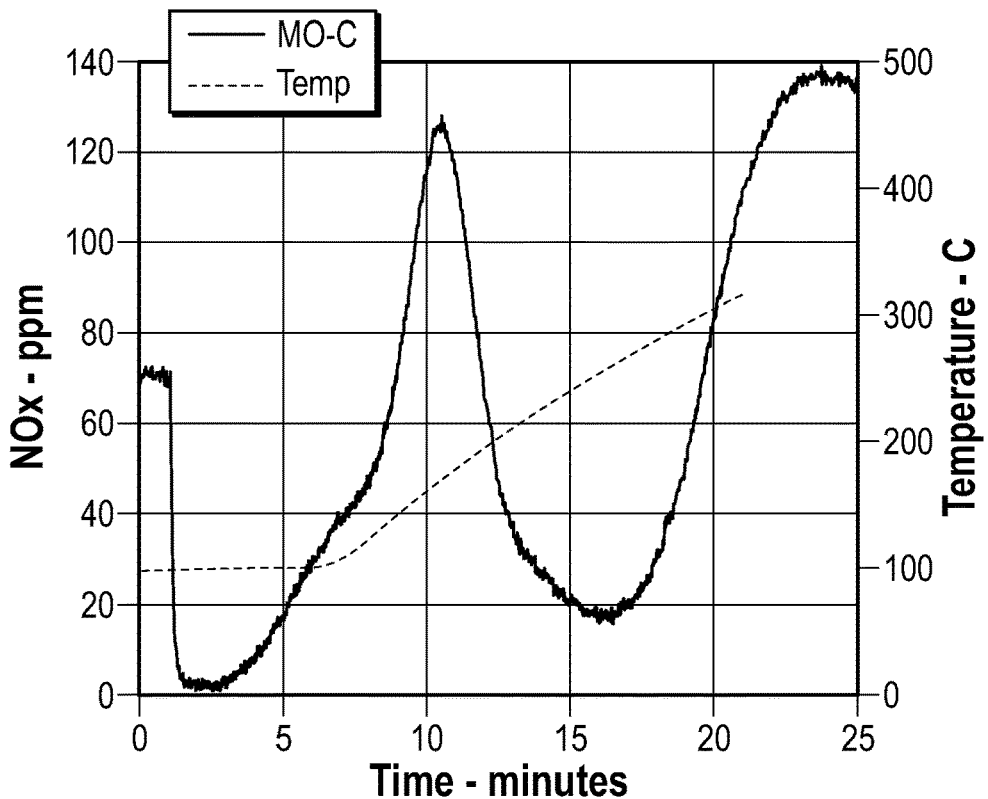
FIG. 7 shows the NOx storage and release vs. time profile for MO-C.
Figure 8:
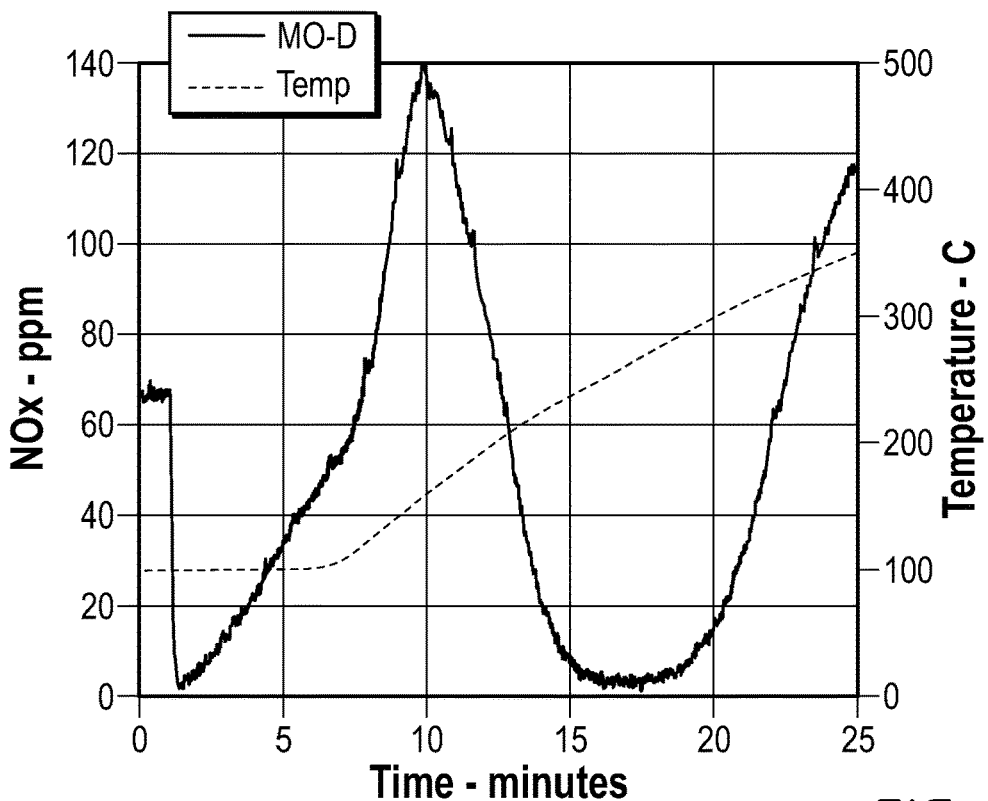
FIG. 8 shows the NOx storage and release vs. time profile for MO-D.
Figure 9:
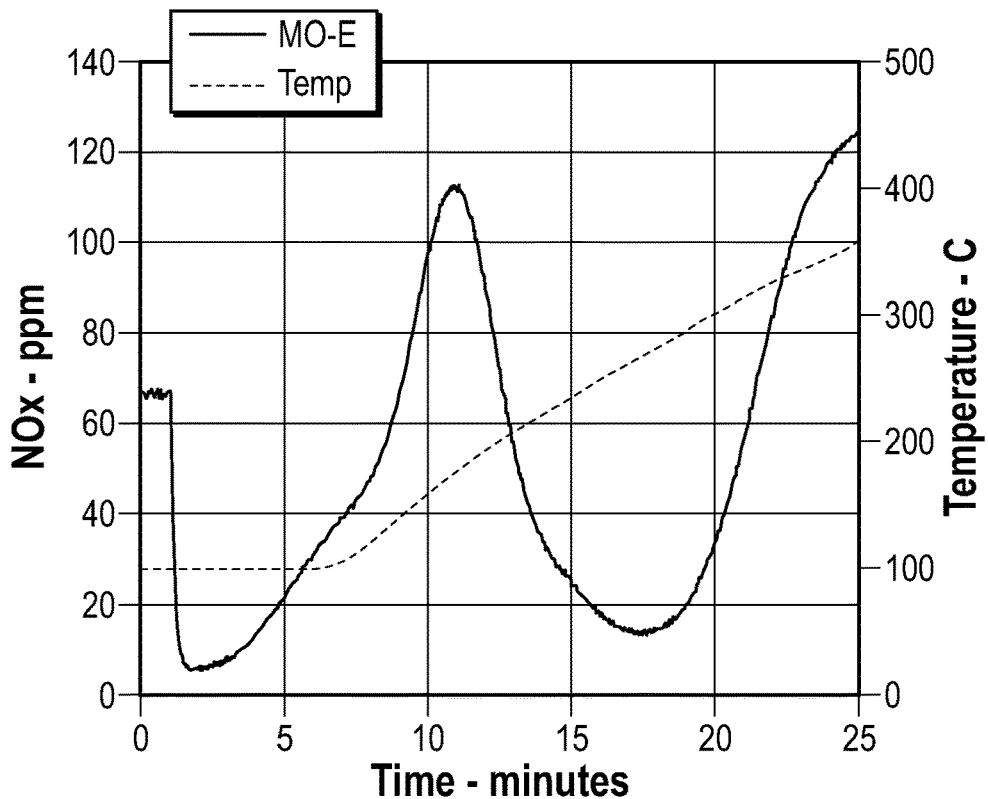
FIG. 9 shows the NOx storage and release vs. time profile for MO-E.
Figure 10:
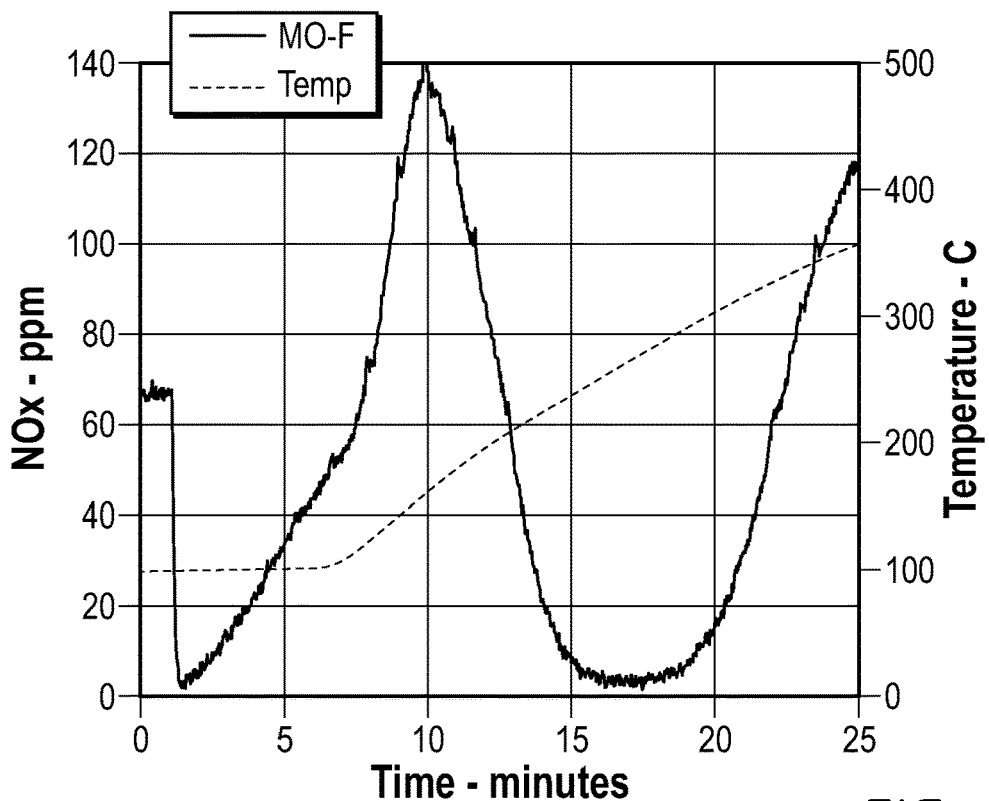
FIG. 10 shows the NOx storage and release vs. time profile for MO-F.
Figure 11:
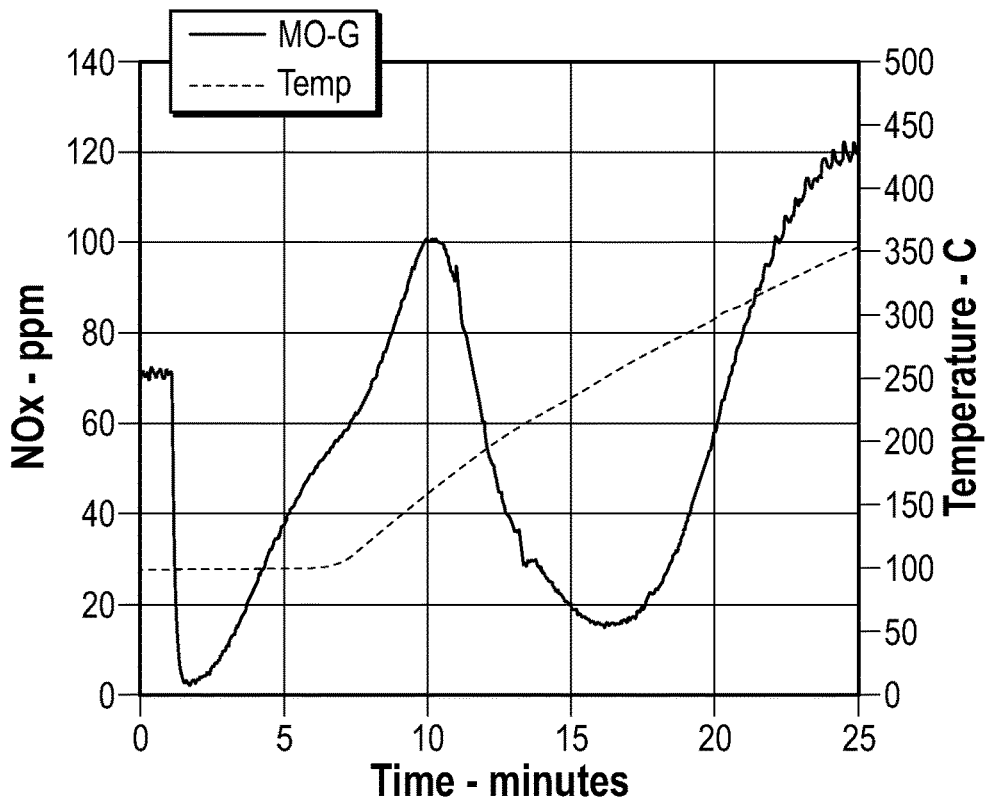
FIG. 11 shows the NOx storage and release vs. time profile for MO-G.
Figure 12:
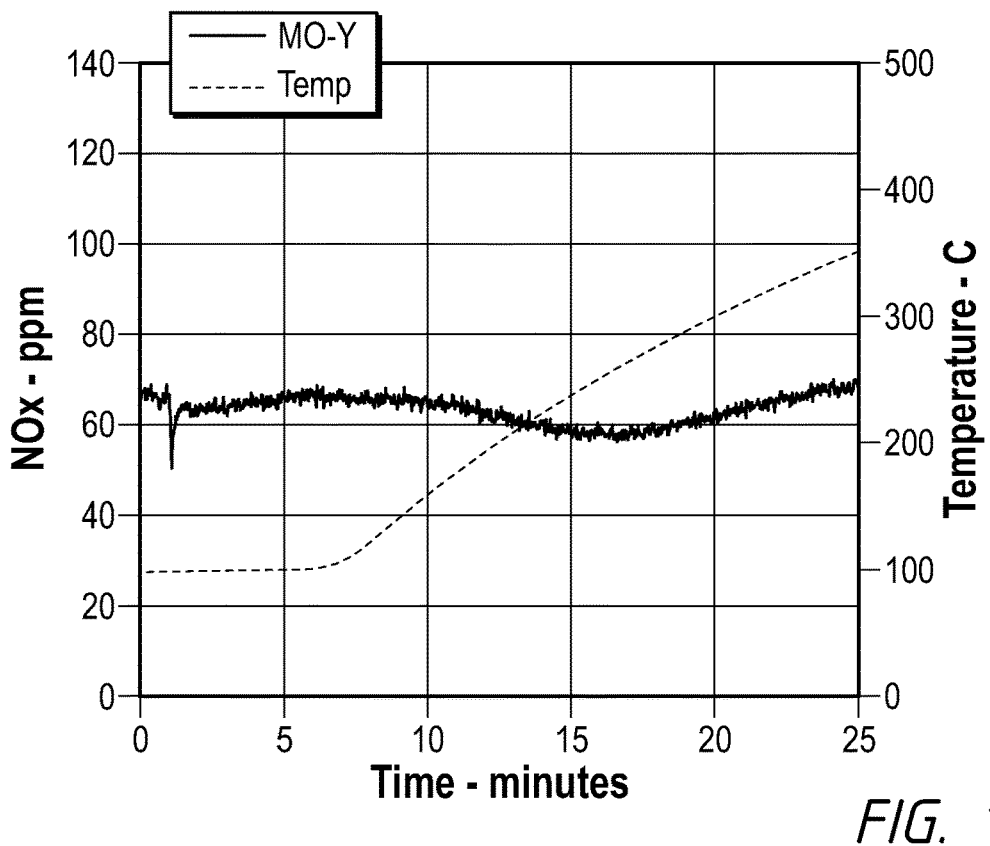
FIG. 12 shows the NOx storage and release vs. time profile for MO-Y.
Figure 13:
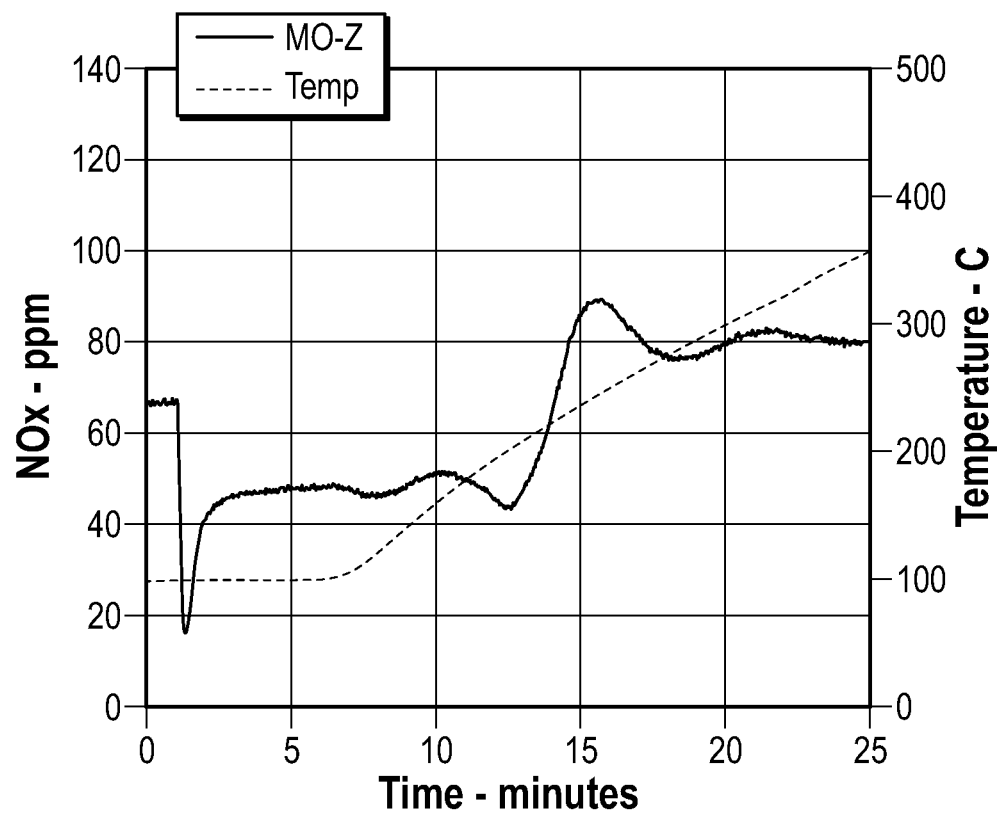
FIG. 13 shows the NOx storage and release vs. time profile for MO-Z.

The XRD of mixed oxide MO-G is show in FIG. 4. Mixed oxide MO-A has a degree of crystallinity of 58%.

Comparative Example 1

Mixed Oxide Y (MO-Y)

Sodium hydroxide and sodium carbonate were dissolved in water to prepare a clear alkali solution with a concentration 2.8 M NaOH and 1.5 M Na$_2$CO$_3$. A 1-L beaker was charged with water (50 mL) and fitted with a pH probe and an overhead stirrer. Fe(NO$_3$)$_3$.9H$_2$O (6.05 g, 0.015 mol), Mg(NO$_3$)$_2$.6H$_2$O (26.90 g, 0.0105 mol), Al(NO$_3$)$_3$.9H$_2$O (142.51 g, 0.380 mol), Zn(NO$_3$)$_2$.6H$_2$O (0.59 g, 2×10$^{-3}$ mol) were dissolved in water (80 mL) to make a salt solution. The alkali solution was added to the beaker to adjust the pH to 10.5. The salt solution was then pumped into the 1-L beaker at a rate of 25 mL/min and the base was added via dropper funnel to maintain pH at 10.3-10.6. A solid formed and the slurry was mixed with an overhead stirrer throughout. Addition of salt solution took 2 h. After the addition of the salt solution the slurry was stirred at room temperature for additional 70 minutes.

The solid was recovered by filtration with a Büchner funnel. The solid was washed with water until conductivity of filtrate reached 1500 µS. Washing lasted for 15 h. The solid was dried in an oven at 105° C. in air overnight, then calcination at 500° C. in air for 2 h.

Comparative Example 2

Mixed Oxide Z (MO-Z)

Sodium hydroxide and sodium carbonate were dissolved in water to prepare a clear alkali solution with a concentration 2.8 M NaOH and 1.5 M Na$_2$CO$_3$. A 1-L beaker was charged with water (50 mL) and fitted with a pH probe and an overhead stirrer. Fe(NO$_3$)$_3$.9H$_2$O (50.52 g, 0.125 mol), Mg(NO$_3$)$_2$.6H$_2$O (6.41 g, 0.0125 mol), Al(NO$_3$)$_3$.9H$_2$O (3.75 g, 0.01 mol), La(NO$_3$)$_2$.6H$_2$O (17.32 g, 0.04 mol) were dissolved in water (80 mL) to make a salt solution. The alkali solution was added to the beaker to adjust the pH to 10.5. The salt solution was added to the beaker at a rate of 25 mL/min and the base was added via a dropper funnel to maintain pH at 10.3-10.6. A solid formed and the slurry was mixed with the stirrer throughout. Addition of the salt solution took 35 min. After the addition of the salt solution the slurry was stirred at room temperature for additional 25 min. The solid was recovered by filtration with a Büchner funnel. The solid was washed with water until the conductivity of filtrate reached 600 µS. Washing lasted for 4 h. The solid was dried in an oven at 105° C. in air overnight, then calcination at 500° C. in air for 2 h.

Example 8

NOx Storage Capacity Test

NOx storage capacity is tested as follows. A solid sample (0.4 g, pellet size 255-350 micron) is held at the adsorption temperature of about 100° C. for 5 minutes in a NO-containing gas mixture flowing at 2 L/min at a mass hourly space velocity ("MHSV") of 300 L-hr$^{-1}$·g$^{-1}$. This adsorption stage is followed by Temperature Programmed Desorption (TPD) at a ramping rate of 17° C./min in the presence of the same NO-containing gas until the bed temperature reaches about 450° C.

The NO-containing gas mixture during both the adsorption and desorption comprises 10 volume percent ("vol %") $O_2$, 60 ppm NO, 5 vol % $CO_2$, 1500 ppm CO, 130 ppm $C_3H_6$, and 5 vol % $H_2O$ in $N_2$.

The NOx storage is calculated as the amount of NO stored in milligrams per gram of the sample (until the outlet NOx concentration reaches the original inlet value).

FIGS. 5-13 show the NOx storage and release vs. time profiles for MO-A, MO-B, MO-C, MO-D, MO-E, MO-F, MO-G, MO-Y and MO-X respectively.

The NOx storage capacity results for MO-A (Example 1), MO-B (Example 2), MO-C(Example 3), MO-D (Example 4), MO-E (Example 5), MO-F (Example 6), MO-G (Example 7), MO-Y (Comparative Example 1), MO-Z (Comparative Example 2) are shown in Table 1 along with the peak NOx release temperatures.

TABLE 1

| | NOx stored, mg/g | | | |
|---|---|---|---|---|
| Sample | Total | $1^{st}$ 5 mins | $1^{st}$ storage-until first release peak | $2^{nd}$ Storage |
| MO-A | 7.45 | 2.21 | 2.96 | 4.49 |
| MO-B | 7.14 | 2.96 | 3.84 | 3.30 |
| MO-C | 6.99 | 3.08 | 3.89 | 3.09 |
| MO-D | 7.39 | 2.36 | 2.61 | 4.78 |
| MO-E | 6.52 | 2.65 | 3.32 | 3.20 |
| MO-F | 6.67 | 2.29 | 2.66 | 4.01 |
| MO-G | 6.12 | 2.42 | 2.67 | 3.46 |
| MO-Y (Comparative) | 1.01 | 0.16 | 0.16 | 0.85 |
| MO-Z (Comparative) | 0.57 | 0.35 | 0.57 | 0.00 |

The results in Table 1 show that MO-A, MO-B, MO-C, MO-D, MO-E, MO-F, and MO-G are effective in storing NOx.

What is claimed:

1. A mixed oxide composition comprising:
   (a) manganese;
   (b) aluminum, magnesium, or a combination of aluminum and magnesium; and
   (c) a rare earth element,
   wherein the mixed oxide composition has a manganese to aluminum and magnesium atomic ratio of from about 100:20 to about 100:60 and a manganese to the rare earth element atomic ratio of from about 100:20 to about 100:60.

2. The mixed oxide composition of claim 1, wherein the rare earth element is selected from the group consisting Ce, Y, La, and mixture thereof.

3. The mixed oxide composition of claim 1, wherein the rare earth element is La.

4. The mixed oxide composition of claim 1, wherein the manganese to aluminum and magnesium atomic ratio is from about 100:25 to about 100:55.

5. The mixed oxide composition of claim 1 having an aluminum to magnesium atomic ratio of from about 99:1 to about 1:99.

6. The mixed oxide composition of claim 1 having a manganese content of about 30 wt % to about 50 wt % relative to the mixed oxide composition.

7. The mixed oxide composition of claim 1, further comprising an alkali metal selected from group consisting of lithium (Li), sodium (Na), potassium (K), rubidium (Rb), cesium (Cs), and mixture thereof.

8. The mixed oxide composition of claim 1, further comprising an alkaline earth metal selected from group consisting of calcium (Ca), strontium (Sr), barium (Ba), and mixture thereof.

9. The mixed oxide composition of claim 1, wherein the manganese, the aluminum and/or magnesium, and the rare earth element are substantially homogeneously distributed through the composition, as determined by energy-dispersive X-ray spectroscopy.

10. A method of making the mixed oxide composition of claim 1, comprising:
   a. mixing a manganese source, an aluminum source and/or a magnesium source, and a rare earth element source to form an aqueous solution having a manganese to aluminum and magnesium atomic ratio of from about 100:20 to about 100:60 and a manganese to the rare earth element atomic ratio of from about 100:20 to about 100:60;
   b. mixing the aqueous solution with an alkali solution to form a slurry comprising a solid;
   c. and isolating the solid.

11. The method of claim 10, whereas the slurry has a pH of from about 9 to about 12.

12. The method of claim 10, whereas the slurry has a pH of from about 9.5 to about 11.5.

13. The method of claim 10, whereas the slurry has a pH of from about 10 to about 11.

14. The method of claim 10, further comprising washing the solid.

15. The method of claim 14, further comprising drying the solid.

16. A NOx adsorber comprising the mixed oxide composition of claim 1.

17. An exhaust system for internal combustion engines comprising the NOx adsorber of claim 16 and a catalyst component selected from the group consisting a selective catalytic reduction (SCR) catalyst, a particulate filter, a SCR filter, a three-way catalyst, an oxidation catalyst, a second NOx adsorber catalyst, and combinations thereof.

18. A method for treating exhaust gas from an internal combustion engine, comprising adsorbing NOx by the NOx adsorber of claim 16 at temperatures at or below a low temperature, thermally desorbing NOx from the NOx adsorber at a temperature above the low temperature, and catalytically removing the desorbed NOx on a catalyst component downstream of the NOx adsorber.

* * * * *